(12) United States Patent
Kamura et al.

(10) Patent No.: US 12,526,525 B2
(45) Date of Patent: Jan. 13, 2026

(54) IMAGING SYSTEM AND IMAGING RANGE ADJUSTMENT METHOD

(71) Applicant: HITACHI HIGH-TECH CORPORATION, Tokyo (JP)

(72) Inventors: Yoshio Kamura, Tokyo (JP); Takeshi Ishida, Tokyo (JP); Junko Tanaka, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 140 days.

(21) Appl. No.: 18/564,749

(22) PCT Filed: Jun. 18, 2021

(86) PCT No.: PCT/JP2021/023244
§ 371 (c)(1),
(2) Date: Nov. 28, 2023

(87) PCT Pub. No.: WO2022/264416
PCT Pub. Date: Dec. 22, 2022

(65) Prior Publication Data
US 2024/0259688 A1    Aug. 1, 2024

(51) Int. Cl.
*H04N 23/69* (2023.01)
*H04N 23/695* (2023.01)

(52) U.S. Cl.
CPC ........... *H04N 23/695* (2023.01); *H04N 23/69* (2023.01)

(58) Field of Classification Search
CPC ...... H04N 23/695; H04N 23/69; G03B 15/07; G01N 21/253
See application file for complete search history.

(56) References Cited

U.S. PATENT DOCUMENTS 9,158,974 B1 * 10/2015 Laska ................... H04N 23/667
2002/0167723 A1 * 11/2002 Eda ..................... G02B 21/0044
359/368

(Continued)

FOREIGN PATENT DOCUMENTS

EP    2 611 954 B1    8/2019
JP    07-83799 A    3/1995

(Continued)

OTHER PUBLICATIONS

International Search Report of PCT/JP2021/023244 dated Sep. 7, 2021.

(Continued)

*Primary Examiner* — Tat C Chio
(74) *Attorney, Agent, or Firm* — MATTINGLY & MALUR, PC

(57) ABSTRACT

An imaging system images measurement targets arranged on a plane and includes a light source that irradiates the measurement targets with light, a photodetector that detects light from the measurement targets, one or more lenses, an adjustment mechanism that focuses imaging on the measurement targets, and a drive mechanism that changes the relative position of the photodetector and the measurement targets. The measurement targets have the same shape and size and are arranged at equal pitches in a longitudinal direction and a lateral direction on the plane, based on a value obtained by multiplying the pitch of the measurement targets by an imaging magnification that is an integer multiple of two or more times of a pixel pitch of the photodetector. In the changing of the relative position by the drive mechanism, an adjustment unit of an imaging range is equal to or less than the pixel pitch.

15 Claims, 14 Drawing Sheets

(56) References Cited

U.S. PATENT DOCUMENTS

| | | | |
|---|---|---|---|
| 2004/0022677 A1 | 2/2004 | Wohlstadter et al. | |
| 2012/0224050 A1 | 9/2012 | Staker | |
| 2013/0088589 A1 | 4/2013 | Negoro et al. | |
| 2015/0045252 A1 | 2/2015 | Maher | |
| 2015/0116477 A1* | 4/2015 | Kang | G02B 21/06 348/79 |
| 2015/0185465 A1* | 7/2015 | Karube | G02B 21/025 348/79 |
| 2019/0113457 A1* | 4/2019 | Espinoza Vallejos | B01J 19/0046 |
| 2019/0310454 A1* | 10/2019 | Shimada | G02B 21/088 |
| 2020/0401785 A1* | 12/2020 | Woehler | G02B 9/06 |
| 2021/0225026 A1 | 7/2021 | Amthor et al. | |

FOREIGN PATENT DOCUMENTS

| | | |
|---|---|---|
| JP | 10-281932 A | 10/1998 |
| JP | 2004279239 A | 10/2004 |
| JP | 2004534226 A | 11/2004 |
| JP | 2008180602 A | 8/2008 |
| JP | 2013-536692 A | 9/2013 |
| JP | 2015515267 A | 5/2015 |
| JP | 2018-155600 A | 10/2018 |
| JP | 2021-113805 A | 8/2021 |
| WO | 2011151866 A1 | 12/2011 |

OTHER PUBLICATIONS

Extended European Search Report received in corresponding European Application No. 21945372.7 dated Mar. 26, 2025.

\* cited by examiner

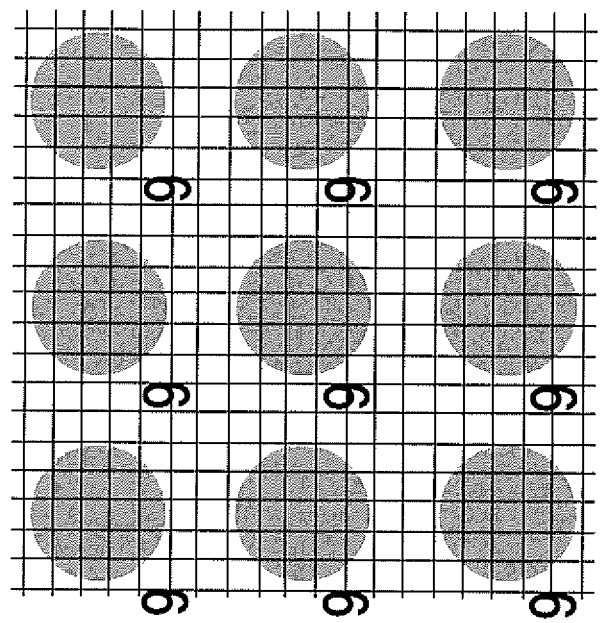
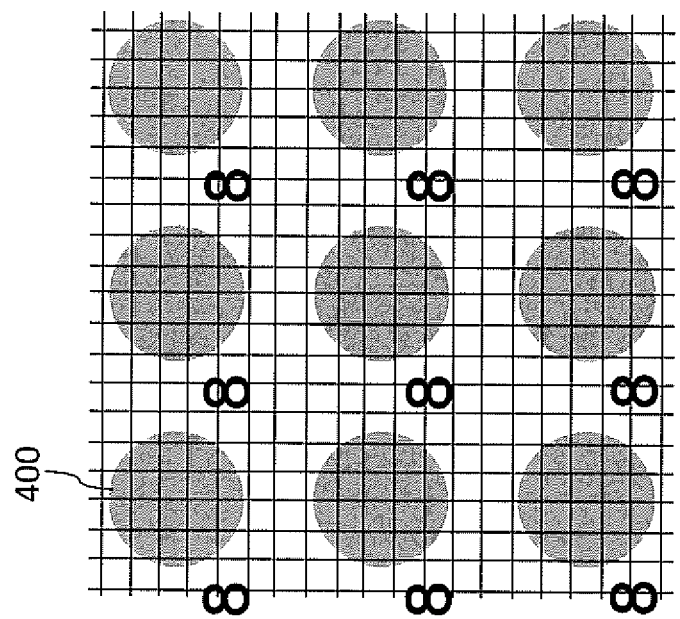
FIG. 11

FIG. 13
WELL SIZE REDUCTION
(60→30 μm)
PIXEL SIZE: 6.5 × 6.5 μm
WELL SIZE: 26 μm
IMAGING MAGNIFICATION: 2x
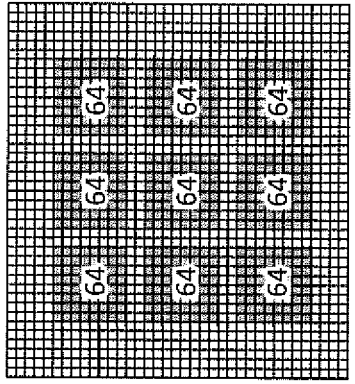
PIXEL SIZE: 6.5 × 6.5 μm
WELL SIZE: 28.01 μm
IMAGING MAGNIFICATION: 1.16x
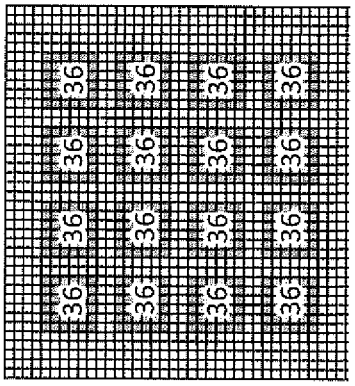
CAMERA MODIFICATION
(PIXEL SIZE 6.5→4.5 μm)
PIXEL SIZE: 4.5 × 4.5 μm
WELL SIZE: 31.03 μm
IMAGING MAGNIFICATION: 1.16x
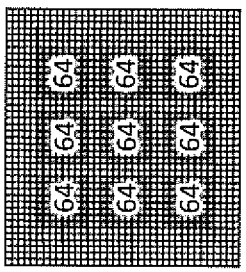

IMAGING SYSTEM AND IMAGING RANGE ADJUSTMENT METHOD

TECHNICAL FIELD

The present invention relates to an imaging system and an imaging range adjustment method.

BACKGROUND ART

In the fields of biochemistry, molecular biology, and the like, measurement is performed in which a trace amount of sample is added to a microplate, which is provided with a large number of small independent reaction sites, and the sample is made to react, an image of a change in color of the reaction sites due to the reaction is captured, and digital counting is performed. In image capture by a measurement device which includes large number of multiwells atop a plate, like a microplate, the relationship between the size of the wells in the plate and the pixel size of a CCD or CMOS camera serving as a photodetector is important. When the well size is sufficiently larger than the pixel size, the number of pixels (the number of data points) covering each well increases. On the other hand, when the well size decreases, the number of data points corresponding to each well is reduced, and the reliability of signal intensity decreases from the viewpoint of data analysis. For this reason, it is necessary to increase the number of data points of each well.

Patent Literature 1 indicates that a sample holder constituted by multiwells includes at least 20,000 independent reaction sites, and that an optical sensor includes a predetermined number of pixels, the predetermined number of pixels being at least twenty times the number of independent reaction sites.

CITATION LIST

Patent Literature

PTL 1: JP 2015-515267 A

SUMMARY OF INVENTION

Technical Problem

In imaging such as multiwell imaging, the fact that the number of data points is reduced due to the dependency on well size, and signal intensity reliability is thus reduced is a problem.

In order to prevent a decrease in the number of data points and perform highly reliable measurement, the number of data points may be increased by increasing the number of pixels of the camera, or a measurement device including a large number of multiwells may be enlarged and imaging may be performed a plurality of times. However, the foregoing measures lead to an increased camera cost and an increase in measurement time.

Patent Literature 1 indicates that it is important to maintain a large number of pixels at each reaction site in order to perform accurate calculation at the time of signal analysis. In addition, to that end, it is indicated that there is a possibility that the number of data points can be increased slightly by making the well shape a hexagon rather than a circle. However, this means that by changing from a circle to a hexagon, the well surface area increases, and the number of data points increases accordingly. Using such a well shape, in a case where wells having a hexagonal size inscribed in a circle are used, for example, the number of data points may be reduced because the well surface area is smaller than that of a circle. Furthermore, there is no mention of guidelines, methods, or advantageous effects regarding an increase in the number of data points resulting from adjustment of an optical system.

The present invention was conceived of in view of the above circumstances, and provides a technology for further increasing the number of well data points by using a camera having a smaller number of pixels, thereby improving the measurement accuracy.

Solution to Problem

An example of the imaging system according to the present invention is an imaging system that images a plurality of measurement targets arranged on a plane, the imaging system including: a light source that irradiates the plurality of measurement targets with light; a photodetector that detects light from the plurality of measurement targets; one or more lenses; an adjustment mechanism that focuses imaging on the plurality of measurement targets; and a drive mechanism that changes relative position of the photodetector and the plurality of measurement targets, wherein the plurality of measurement targets have the same shape and the same size, the plurality of measurement targets are arranged at equal pitches in a longitudinal direction and a lateral direction on the plane, a value obtained by multiplying the pitch of the plurality of measurement targets by an imaging magnification is an integer multiple, which is two or more times, of a pixel pitch of the photodetector, and in the changing of the relative position by the drive mechanism, an adjustment unit of an imaging range is equal to or less than the pixel pitch.

An example of an imaging range adjustment method according to the present invention is an imaging range adjustment method for imaging a plurality of measurement targets arranged on a plane, the imaging range adjustment method being executed by an imaging system, and the imaging system having: a light source that irradiates the plurality of measurement targets with light; a photodetector that detects light from the plurality of measurement targets; one or more lenses; an adjustment mechanism that focuses imaging on the plurality of measurement targets; and a drive mechanism that changes relative position of the photodetector and the plurality of measurement targets, the plurality of measurement targets having the same shape and the same size, and the plurality of measurement targets being arranged at equal pitches in a longitudinal direction and a lateral direction on the plane, the imaging range adjustment method including: the drive mechanism performing focusing on the plurality of measurement targets; acquiring an image by imaging the plurality of measurement targets by means of the photodetector; the drive mechanism rotating at least one of the plurality of measurement targets or the photodetector such that the plurality of measurement targets are arranged in a horizontal direction or a vertical direction within the image; the drive mechanism changing the relative position of the photodetector and the plurality of measurement targets in a first axial direction on the basis of a peak shape of at least one of a peak of maximum intensity or a peak of minimum intensity among peaks in a histogram of pixel intensities in the image; and the drive mechanism changing the relative position in a second axial direction orthogonal to the first axial direction on the basis of a peak shape of at least one of the peak of maximum intensity or the peak of minimum intensity among the peaks in the histogram of pixel intensities in the image.

An example of an imaging range adjustment method according to the present invention is an imaging range adjustment method for imaging a plurality of measurement targets arranged on a plane, the imaging range adjustment method being executed by an imaging system, and the imaging system having: a light source that irradiates the plurality of measurement targets with light; a photodetector that detects light from the plurality of measurement targets; one or more lenses; an adjustment mechanism that focuses imaging on the plurality of measurement targets; and a drive mechanism that changes position of the relative photodetector and the plurality of measurement targets, the plurality of measurement targets having the same shape and the same size, and the plurality of measurement targets being arranged at equal pitches in a longitudinal direction and a lateral direction on the plane, the imaging range adjustment method including: the drive mechanism performing focusing on the plurality of measurement targets; acquiring an image by imaging the plurality of measurement targets by means of the photodetector; the drive mechanism rotating at least one of the plurality of measurement targets or the photodetector such that the plurality of measurement targets are arranged in a horizontal direction or a vertical direction within the image; the drive mechanism changing the relative position in a first axial direction on the basis of a standard deviation of pixel intensities in the image; and the drive mechanism changing the relative position in a second axial direction orthogonal to the first axial direction on the basis of a standard deviation of pixel intensities in the image.

Advantageous Effects of Invention

According to the present invention, the number of well data points can be increased further by using a camera having a smaller number of pixels, thereby improving the measurement accuracy.

Furthermore, because the number of effective pixels of the photodetector can be maximally utilized, the number of wells that can be measured in one measurement can be increased.

Further features relating to the present invention will become apparent from the description of the present specification and the accompanying drawings. Moreover, problems, configurations, advantageous effects, and the like, other than those described above will be clarified by the description of the embodiments below.

BRIEF DESCRIPTION OF DRAWINGS

FIG. 11 is a diagram illustrating the application of an imaging range adjustment method to circular wells.

FIG. 13 is a diagram illustrating the relationship between wells and pixels under various measurement conditions.

DESCRIPTION OF EMBODIMENTS

Hereinafter, embodiments of the present invention will be described with reference to the drawings.

First Embodiment

A first embodiment will be described hereinbelow with reference to FIGS. 1 to 7. A first embodiment illustrates an imaging range adjustment method by an imaging system that images a plurality of measurement targets. In the first embodiment, the adjustment mechanism of the imaging system enables the imaging range to be adjusted on a total of four axes, namely the XYZ axes and a θ axis. By using the imaging system of the present embodiment, the number of well data points can be increased.

Figure 1:
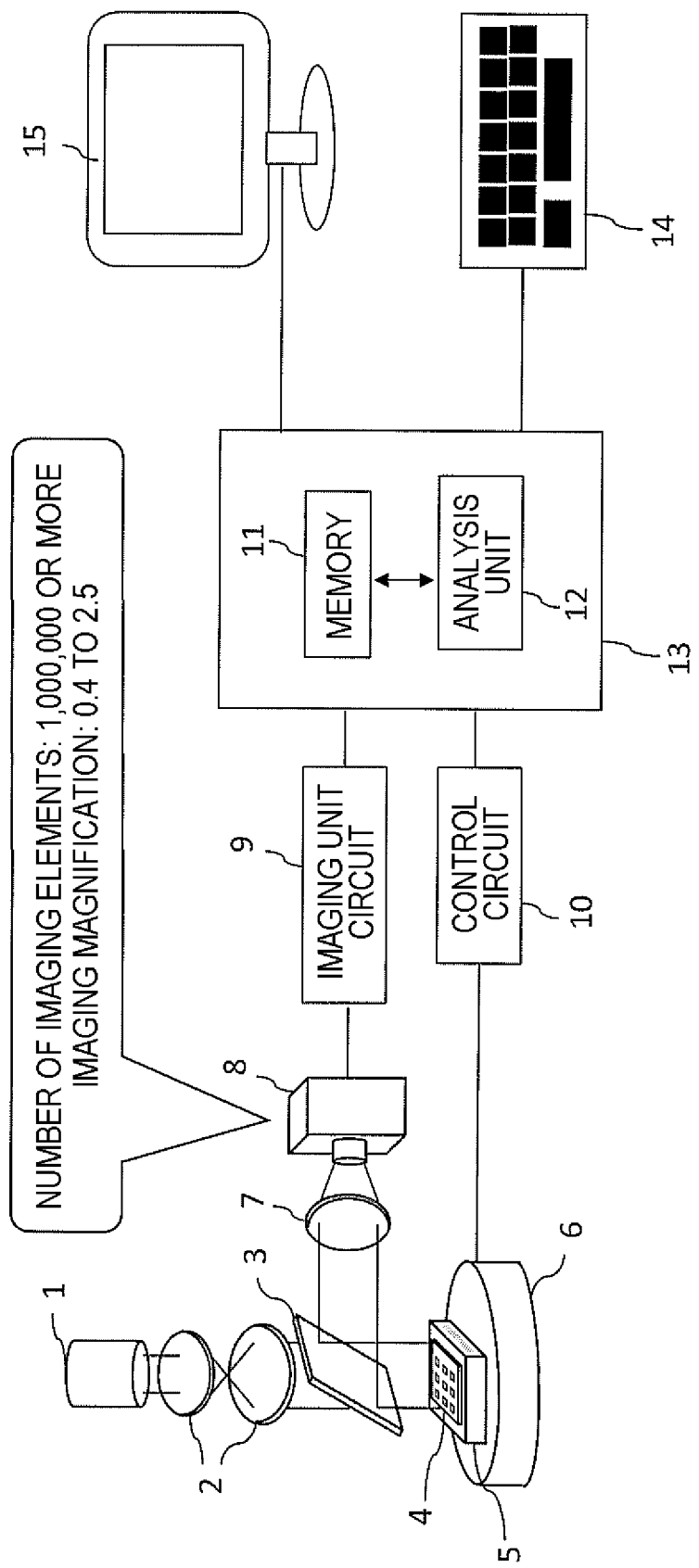
FIG. 1 is a configuration diagram of an imaging system for adjusting an imaging range according to a first embodiment of the present invention.

FIG. 1 is an overall configuration diagram of an imaging system according to the first embodiment. The imaging system includes a microscope and is capable of imaging a plurality of measurement targets 4 arranged on a plane. The microscope includes a light source 1 that irradiates the measurement targets 4 with light, one or more lenses 2, a half mirror 3, an XYZ-axis stage 5, a θ-axis stage 6, a camera lens 7, a camera 8, an imaging unit circuit 9, a control circuit 10, and a computer 13.

Although the imaging system according to the present embodiment does not include the measurement targets 4, it is also possible to configure an imaging system that includes the measurement targets 4.

The imaging system is capable of executing an imaging range adjustment method for imaging the plurality of measurement targets 4 according to the present embodiment.

The computer 13 has a known hardware configuration serving as a computer, and includes a calculation means and a storage means, for example. The calculation means includes, for example, a processor, and the storage means includes, for example, a storage medium such as a semiconductor memory device and a magnetic disk device. Some or all of the storage medium may be a non-transitory storage medium.

In addition, the computer may include an input/output means. The input/output means includes, for example, an input device such as a keyboard and a mouse, an output device such as a display and a printer, and a communication device such as a network interface.

The storage means may store a program. As a result of the processor executing this program, the computer may execute the functions described in the present embodiment.

In the present embodiment, the storage means is, for example, a memory 11, the calculation means functions as an analysis unit 12, the input device is, for example, an operation unit 14 for inputting information, and the output device is, for example, a display unit 15 that displays information related to the imaging system (including images captured by the camera 8).

By using a CCD or CMOS camera of a sensor shift system, for example, as the camera 8, it is possible to acquire a high-resolution and high-accuracy image. By using a camera 8 having 1,000,000 or more imaging elements, it is possible to acquire an image of a higher resolution. Although the imaging magnification can be arbitrarily designed, if the imaging magnification is 0.4 times or more and 2.5 times or less, the imaging magnification is well suited to an existing imaging system.

The beam spot diameter of the light from the light source 1 is adjusted by one or more lenses 2 (two in the present embodiment), and the light is transmitted through the half mirror 3 and then irradiated onto the plurality of measurement targets 4. In a certain embodiment, a uniform irradiation unit such as a light guide may be introduced at the position of the lens 2 and used to improve optical performance by providing uniform irradiation light. The light emitted from the plurality of measurement targets 4 is reflected by the half mirror 3, condensed and focused by the camera lens 7, and detected by the camera 8.

The plurality of measurement targets 4 are movably fixed to the XYZ-axis stage 5. The XYZ-axis stage 5 moves the measurement targets 4 in a Z-axis direction with respect to the camera 8. For example, the XYZ-axis stage 5 functions as an adjustment mechanism that focuses imaging on the measurement targets 4.

The XYZ-axis stage 5 is rotatably fixed to the θ-axis stage 6. The XYZ-axis stage 5 and the θ-axis stage 6 function as a drive mechanism that changes the relative position of the camera 8 and the measurement targets 4. For example, the XYZ-axis stage 5 translates the measurement targets 4 in a plane XY, and the θ-axis stage 6 rotates the measurement targets 4 in the plane XY.

The XYZ-axis stage 5 may have one or more operation mechanisms for each axis. For example, two types of X-axis operation mechanisms are held, and include a manual stage and an automatic stage (stepping motor or piezo element). In addition, the camera 8 may be configured such that the light detection element moves along the X axis and/or the Y axis and rotates about the θ axis (in this case, the camera 8 also functions as a drive mechanism).

The imaging unit circuit 9 transmits a signal of an imaging condition to the camera 8 and receives data from the camera 8. The data received by the imaging unit circuit 9 is transmitted to and recorded in the memory 11 in the computer 13. Data is sent and received between the memory 11 and the analysis unit 12 (analysis mechanism). The analysis unit 12 analyzes the data, and transmits a signal of an imaging condition to the imaging unit circuit 9 and a signal of a control condition of each axis to the control circuit 10, according to the analysis result (for example, when the analysis result does not satisfy a predetermined condition).

The control circuit 10 controls the XYZ-axis stage 5 and the θ-axis stage 6 on the basis of the signal received from the analysis unit 12. The display unit 15 displays information regarding a series of processing by the imaging unit circuit 9, the control circuit 10, the memory 11, and the analysis unit 12. The control value and the like used for the series of processing can be inputted using the operation unit 14.

Figure 2:
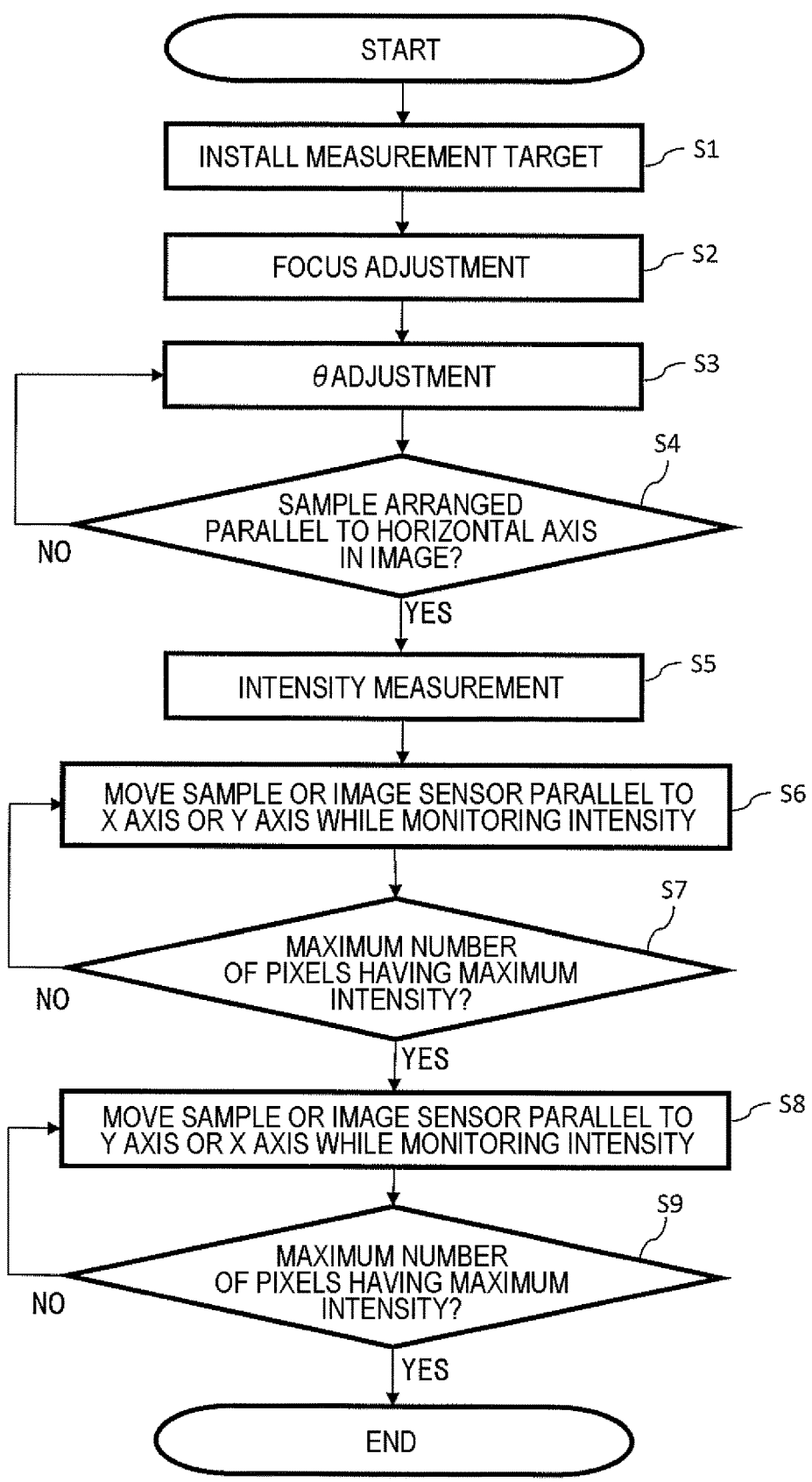
FIG. 2 is a representative flowchart for adjusting an imaging range.

FIG. 2 is a diagram illustrating a flowchart for adjusting an imaging range by means of the imaging system illustrated in FIG. 1. An adjustment method will be described with reference to the optical component illustrated in FIG. 1. The plurality of measurement targets 4 are installed on the XYZ-axis stage 5 (S1).

The plurality of measurement targets 4 are imaged by the camera 8, and while images are being acquired, the XYZ-axis stage 5 is moved in the Z axis direction (for example, moved up and down) based on the acquired images, thereby adjusting to the optimum focal position (S2). In this way, the XYZ-axis stage 5 performs focusing on the plurality of measurement targets 4. Note that a specific method for performing focusing on the basis of an image can be appropriately designed by a person skilled in the art on the basis of a known technique or the like.

In the θ-axis adjustment, the plurality of measurement targets 4 are rotated by the θ-axis stage 6 (S3), and the direction of the multiwell is matched with a predetermined direction (S4). That is, the θ-axis stage 6 rotates the plurality of measurement targets so that the plurality of measurement targets 4 are arranged in the horizontal direction or the vertical direction in the image. Details are described below with reference to FIGS. 3 and 4.

After the θ-axis adjustment, the camera 8 images the plurality of measurement targets 4 to acquire images. That is, the intensity is measured for all the pixels of the camera 8 (S5). Thereafter, based on the shape of the peak of maximum intensity among the peaks in a histogram of pixel intensities in the image, the XYZ-axis stage 5 changes the relative position of the camera 8 and the plurality of measurement targets 4 in the X-axis (first-axis) direction (S6).

Details will be described below with reference to FIG. 5; however, in the present embodiment, the processing of S6 is executed on the basis of peak height, and is executed such that the height of the peak of maximum intensity among the peaks in the histogram of pixel intensities in the image is maximized (S7). S6 and S7 are executed while image acquisition is performed by the camera 8 as needed.

In one example, in S6, the relative position is moved in the X-axis direction, for example, from a position X0 to a position X1, and the peak height is acquired. Thereafter, in S7, a height H1 of the peak acquired at position X1 is compared with a height H0 of the peak acquired at position X0. If H1≥H0, it is determined that the height of the peak has not yet reached the maximum, and the processing returns to S6. On the other hand, when H1<H0, it is determined that the height of the peak has reached the maximum, and the processing advances to S8. In this case, the maximum height of the peak is H0.

In another example, the relative position may be swept for a predetermined X-direction range to determine the position at which the peak height is maximum.

Thereafter, adjustment in the Y-axis direction is similarly performed. That is, based on the shape of the peak of maximum intensity among the peaks in the histogram of the pixel intensities in the image, the XYZ-axis stage 5 changes the relative position of the camera 8 and the plurality of measurement targets 4 in the Y-axis (second axis orthogonal to the first axis) direction (S8). In the present embodiment, the processing of S8 is executed so that the height of the peak of maximum intensity among the peaks in the histogram of the pixel intensities in the image is maximized (S9). S8 and S9 are executed while image acquisition is performed by the camera 8 as needed.

By executing the operation of this flowchart, the number of in-well data points available for analysis increases. In a certain modification, instead of or in addition to the XYZ-axis stage 5 and the θ-axis stage 6, an adjustment mechanism of the X-axis, the Y-axis, and the θ-axis provided to the camera 8 may be used to change the relative position of the camera 8 and the plurality of measurement targets 4.

The configuration and the flowchart of the imaging system according to the present embodiment have been described above. Hereinafter, a detailed operation flow of the θ-axis adjustment and the XY-axis adjustment, which are features of the present system, will be described.

As described above, the imaging system according to the present embodiment includes the memory 11 for recording data from the camera 8 and the analysis unit 12 for analyzing the data. The XYZ-axis stage 5 and the θ-axis stage 6 change the relative position of the camera 8 and the plurality of measurement targets 4 while monitoring the pixel intensity according to the detection result of the camera 8. Such a configuration enables position adjustment in real time.

Figure 3:
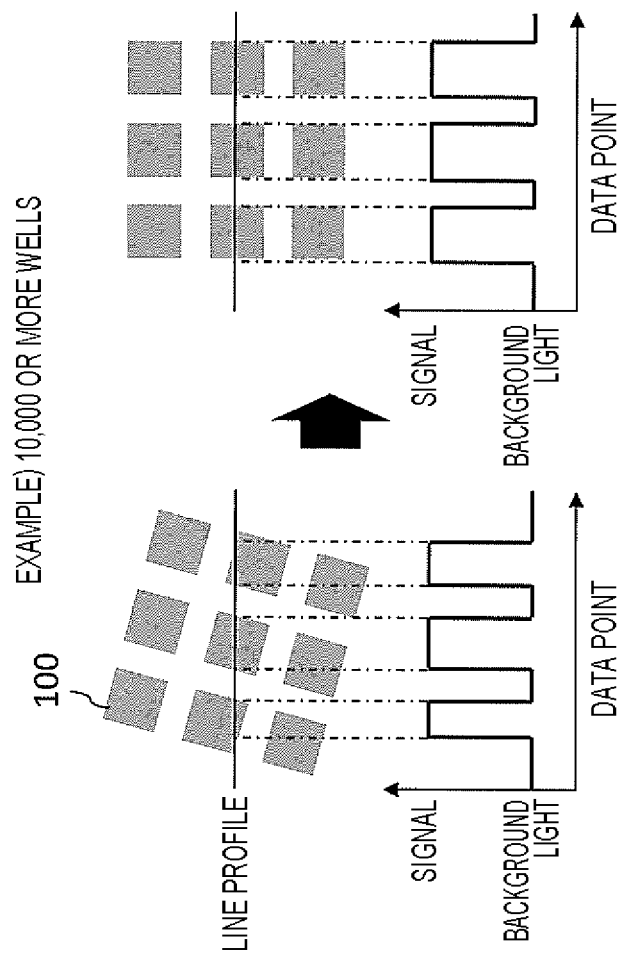
FIG. 3 is a diagram to illustrate a θ-axis adjustment method using multiwells.

FIG. 3 is a diagram illustrating a method of adjusting a plurality of measurement targets 4 to be horizontal. In this example, a plurality of quadrangular wells 100 is used as the plurality of measurement targets 4. The quadrangular wells 100 have the same shape and the same size, and are, for example, square. The quadrangular wells 100 are arranged in a 3×3 configuration. The quadrangular wells 100 are arranged on a plane at equal pitches in the longitudinal direction and the lateral direction. Here, the "longitudinal direction" and the "lateral direction" signify directions orthogonal to each other, but an absolute definition of the longitudinal direction or the lateral direction of the XYZ-axis stage 5 can be arbitrarily designed. In addition, when the number of quadrangular wells 100 imaged at a time is 10,000 or more, a large number of wells can be efficiently processed.

The quadrangular well 100 may be a multiwell plate reaction well or a digital PCR reaction well. With such a configuration, the present embodiment can be applied to a multiwell or digital PCR determination.

In order to evaluate the horizontality of the plurality of measurement targets 4, an on-sample line profile is acquired. The line profile is, for example, a profile representing pixel intensity in each position on a straight line parallel to the X axis. The line profile is acquired horizontally so that one or more wells are included. A well-position signal is strongly observed between the data point and the intensity acquired in the line profile, and background light intensity is observed in a position where no well is present.

In order to evaluate horizontality, attention is focused on a period of change in the signal and in the background light intensity. When the plurality of measurement targets 4 are installed obliquely, the period of change is not constant, and variation is present. When the plurality of measurement targets 4 are installed horizontally, the period of change is constant.

Figure 4:
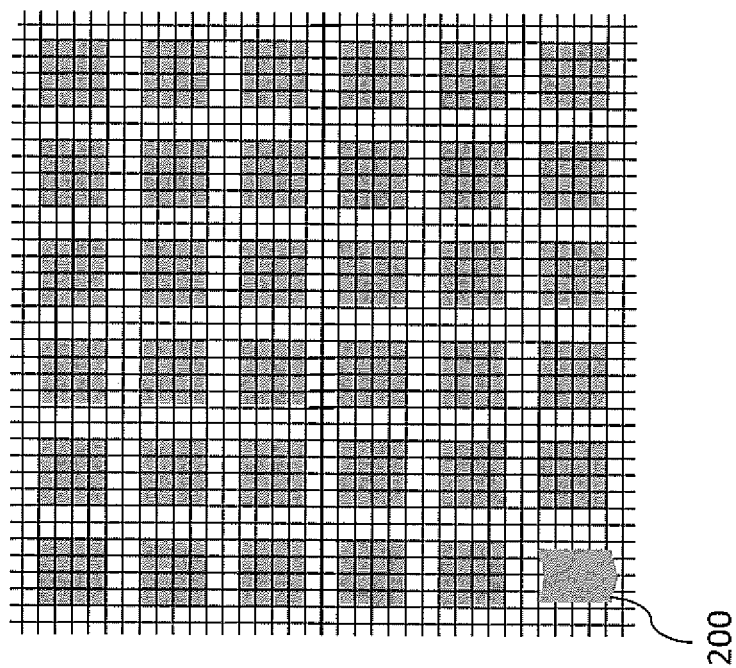
FIG. 4 is a diagram to illustrate a θ-axis adjustment method using a reference marker.

FIG. 4 is a diagram illustrating another method of adjusting the plurality of measurement targets 4 to be horizontal. In the method shown in FIG. 4, a reference marker 200 prepared on a measurement target instead of the multiwell is used. A straight line passing through two specific vertices of the reference marker 200 is acquired and evaluated based on whether the straight line is horizontal. If the line is horizontal, this means that the measurement target is installed horizontally. The shape of the reference marker 200 is not limited to the shape illustrated.

The method above is a method in which the plurality of measurement targets 4 are arranged horizontally by operating the θ-axis stage 6. Hereinafter, adjustment in the X axis and the Y axis by the XYZ-axis stage 5 will be described.

Figure 5:
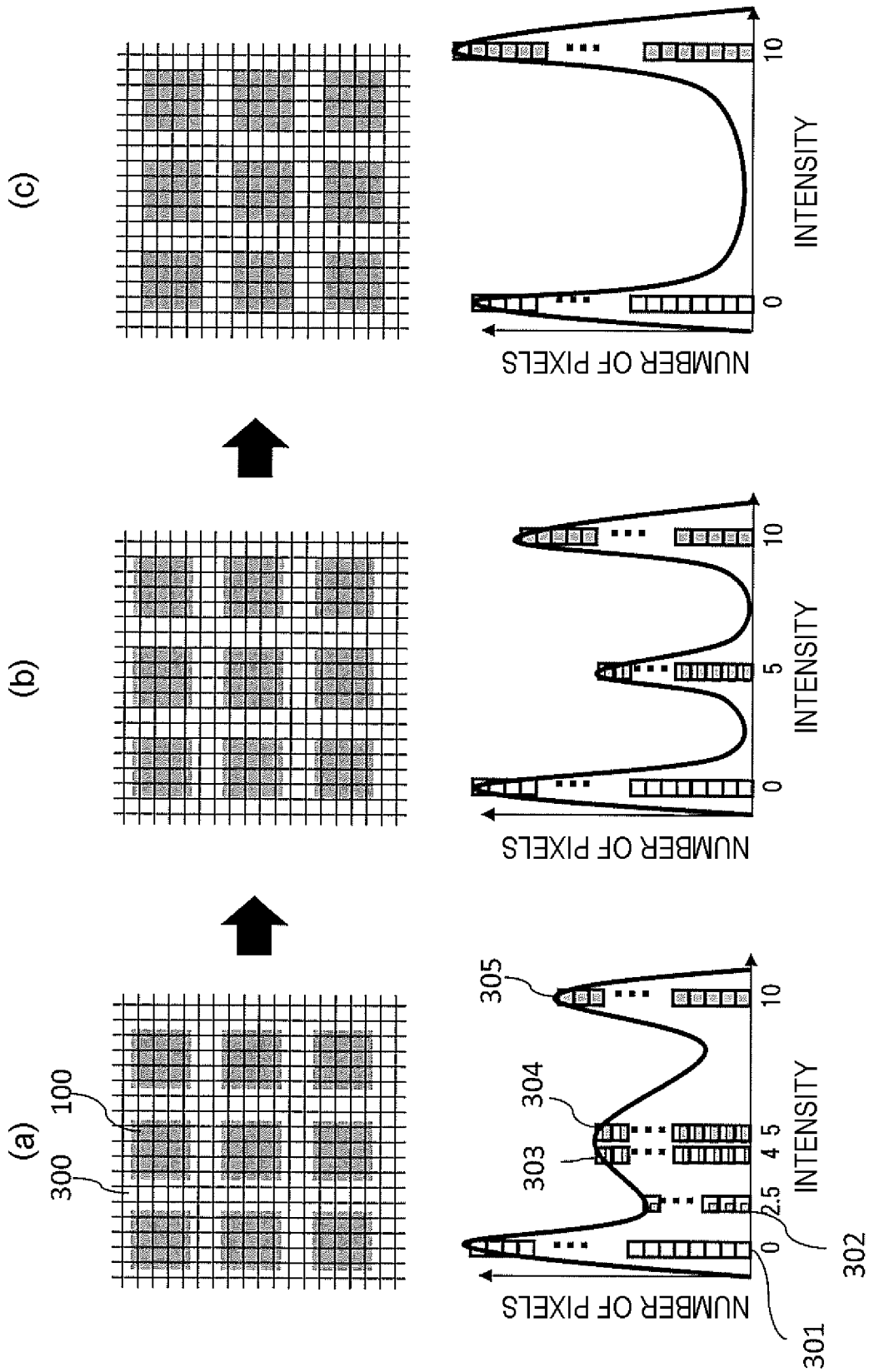
FIG. 5 is a diagram illustrating a distribution of signal intensity and numbers of pixels by using X-axis and Y-axis adjustment.

FIG. 5 illustrates the relationship between wells and pixels when a plurality of measurement targets 4 are adjusted in the X-axis direction and the Y-axis direction by the XYZ-axis stage 5. FIG. 5(*a*) corresponds to the intensity measurement after θ-axis adjustment (S5) in FIG. 2.

At the start of imaging, the relationship between the quadrangular wells 100 and the pixels 300 is random. Therefore, some pixels cover an entire well, and some pixels partially cover wells.

When the distribution of the number of pixels with respect to the pixel intensity at this time is illustrated on a graph, there are pixels 301 with an intensity of 0, pixels 302 with an intensity of 2.5, pixels 303 with an intensity of 4, pixels 304 with an intensity of 5, and pixels 305 with an intensity of 10. In this way, spreading of the pixel intensity distribution occurs. Because the spreading of the pixel intensity distribution leads to a reduction in the accuracy of signal analysis, it is desirable to narrow the spreading of the distribution as much as possible.

In order to narrow the pixel intensity distribution, adjustments in the X-axis direction and the Y-axis direction are performed by the XYZ-axis stage 5 as illustrated in FIGS. 5(*b*) and 5(*c*). With regard to the order of adjustments in the X-axis direction and the Y-axis either direction may be adjusted first. As per FIG. 5(*b*), by adjusting in the X axis while monitoring the pixel intensity distribution, the number of pixels fully covering wells (that is, pixels of which entire regions correspond to a well) increases, while the number of pixels partially covering wells (that is, pixels of which some regions correspond to a well while other regions correspond to the background) decreases. Accordingly, the spreading of the pixel intensity distribution decreases.

Here, in the relative position change by the XYZ-axis stage 5, the adjustment unit of the imaging range is equal to or less than the pixel pitch of the camera 8, and is preferably sufficiently smaller than the pixel pitch of the camera 8. For example, the adjustment unit of the imaging range is 1/10 or less or 1/100 or less of the pixel pitch.

From the state of FIG. 5(*b*), by adjusting the Y axis in a similar manner while further monitoring the pixel intensity distribution, the number of pixels fully covering wells increases, while the number of pixels partially covering wells decreases. As a result, the final pixel distribution is binarized into pixels 301 with an intensity of 0 and pixels 305 with an intensity of 10. Note that, although a plurality of peaks appear in the histogram of FIG. 5(*c*), the peak at intensity 10 corresponds to the peak of maximum intensity among the peaks, and the peak at intensity 0 corresponds to the peak of minimum intensity among the peaks.

Such a series of adjustments enables an increase in the number of pixels fully covering wells (the number of data points fully covering wells). Furthermore, the value of the pixel intensity is, for example, an actual measurement value by the camera 8, and the distribution in FIG. 5 is one example.

Figure 6:
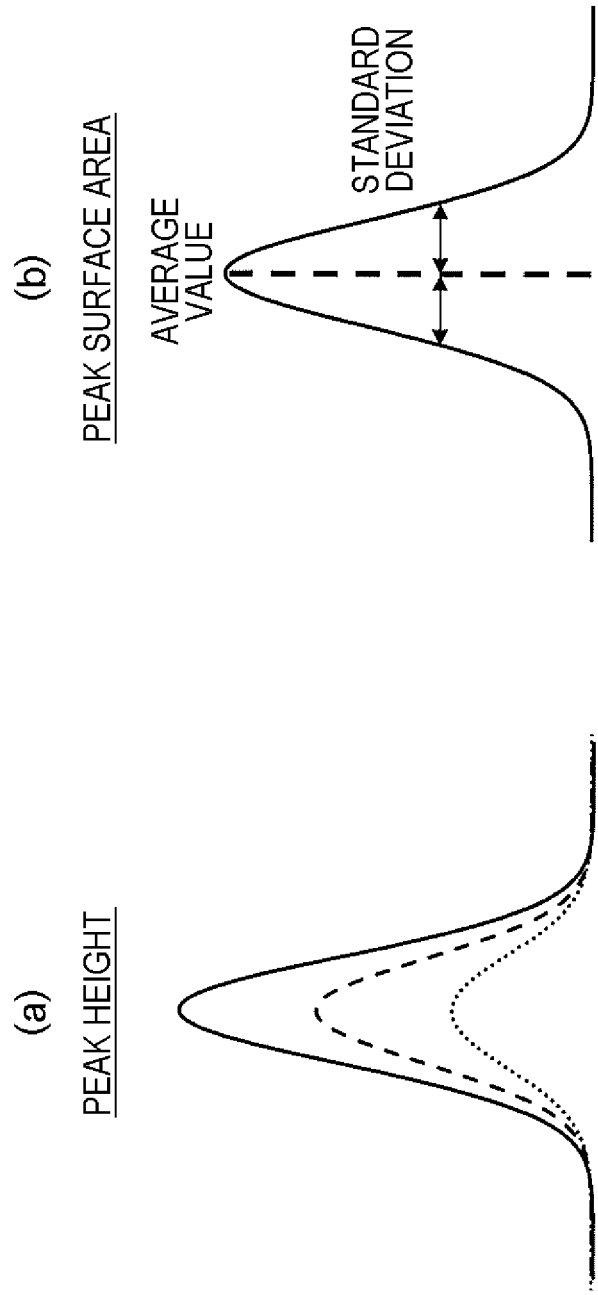
FIG. 6 is a diagram illustrating a peak analysis method in the distribution in FIG. 5.

FIG. 6 illustrates a peak analysis method. An index of the peak analysis is, for example, the peak height or the peak surface area. As the peak surface area, for example, a half-value width range of the peak is acquired, and a surface area within the half-value width range can be used.

Alternatively, for example, the half-value width range of the peak may be acquired as the peak surface area, the average value and the standard deviation of the intensity may be calculated for all the pixels included in the half-value width range, and the surface area within the range of the average value±the standard deviation may be used. As described above, the peak of maximum intensity among the peaks is to be analyzed. That is, in this case, the surface area within the range of the average value±the standard deviation of the pixel intensity at the peak (more strictly, within the half-value width range of the peak) is used. According to such a peak analysis method, it is possible to perform a more appropriate analysis that takes into account not only the peak height but also the distribution within the peak.

Figure 7:
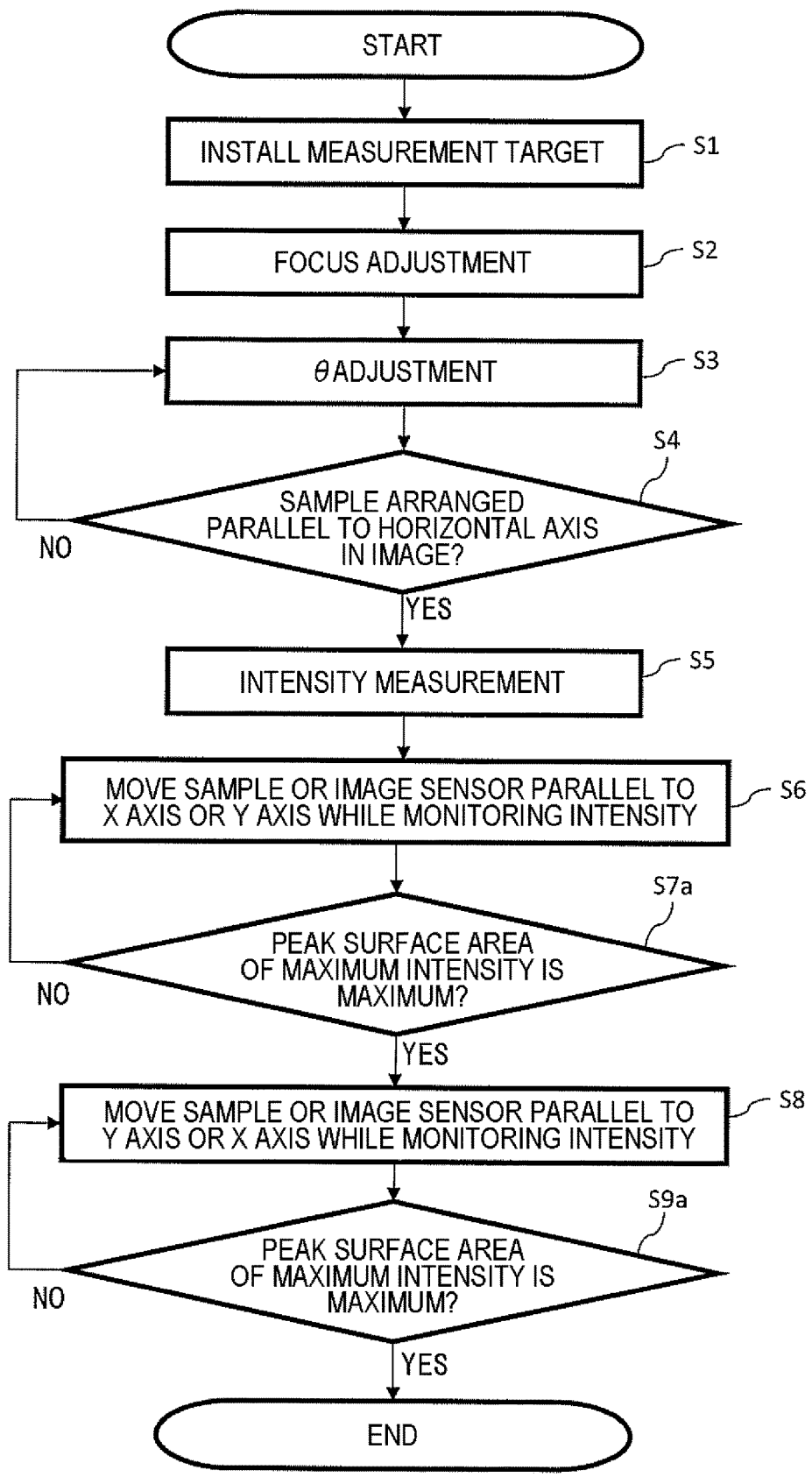
FIG. 7 is a flowchart of a modification in which an imaging range is adjusted based on surface area.

FIG. 7 illustrates a flowchart of a modification in which the imaging range is adjusted using a surface area-based peak analysis method. S7a is executed instead of S7 in FIG. 2, and S9a is executed instead of S9 in FIG. 2.

In the present modification, the processing of S6 is executed based on the peak surface area, and is executed such that the surface area of the peak of maximum intensity among the peaks in a histogram of pixel intensities in the image is maximized (S7a). Similarly, the processing of S8 is also executed based on the peak surface area, and is executed such that the surface area of the peak of maximum intensity among the peaks in a histogram of pixel intensities in the image is maximized (S9a).

In this way, by changing the relative position of the camera 8 and the measurement targets 4 on the basis of the peak height (FIG. 2) or surface area (FIG. 7), the relationship between the pixels and the measurement targets can be optimized. For example, the number of in-well data points can be increased, and the reliability of the signal strength can be further improved.

In the first embodiment and the modification thereof described above, the relative position of the camera 8 and the plurality of measurement targets 4 is changed based on the peak shape of the peak of maximum intensity among the peaks in the histogram (that is, the peak of intensity 10 in FIG. 5(c)); however, as a modification, the relative position of the camera 8 and the plurality of measurement targets 4 may be changed based on the peak shape of the peak of minimum intensity among the peaks in the histogram (that is, the peak of intensity 0 in FIG. 5(c)).

Alternatively, the relative position of the camera 8 and the plurality of measurement targets 4 may be changed based on the shapes of both the peak of maximum intensity and the peak of minimum intensity among the peaks in the histogram (for example, based on the sum of the heights of these two peaks). In this way, the relative position can be optimized by considering a wide intensity range.

Second Embodiment

Hereinafter, a second embodiment will be described with reference to FIGS. 8 and 9. Hereinafter, descriptions of parts common to the first embodiment may be omitted.

The second embodiment determines, by means of standard deviation, the relationship between wells and pixels when a plurality of measurement targets 4 are adjusted by the XYZ-axis stage 5 in the X-axis direction and the Y-axis direction. Unlike the first embodiment (FIG. 5), this determination method does not require monitoring of the histogram of the pixel intensity distribution.

FIG. 8(a) corresponds to the relative position after θ-axis adjustment in FIG. 2. At this time, the standard deviation of all the pixel intensities used for the measurement is calculated. As per the first embodiment (FIG. 5), the pixels fully covering wells are set at a pixel intensity of 10, the pixels not covering wells at all are set at a pixel intensity of 0, and the pixels partially covering wells retain a pixel intensity between these intensities.

Figure 8:
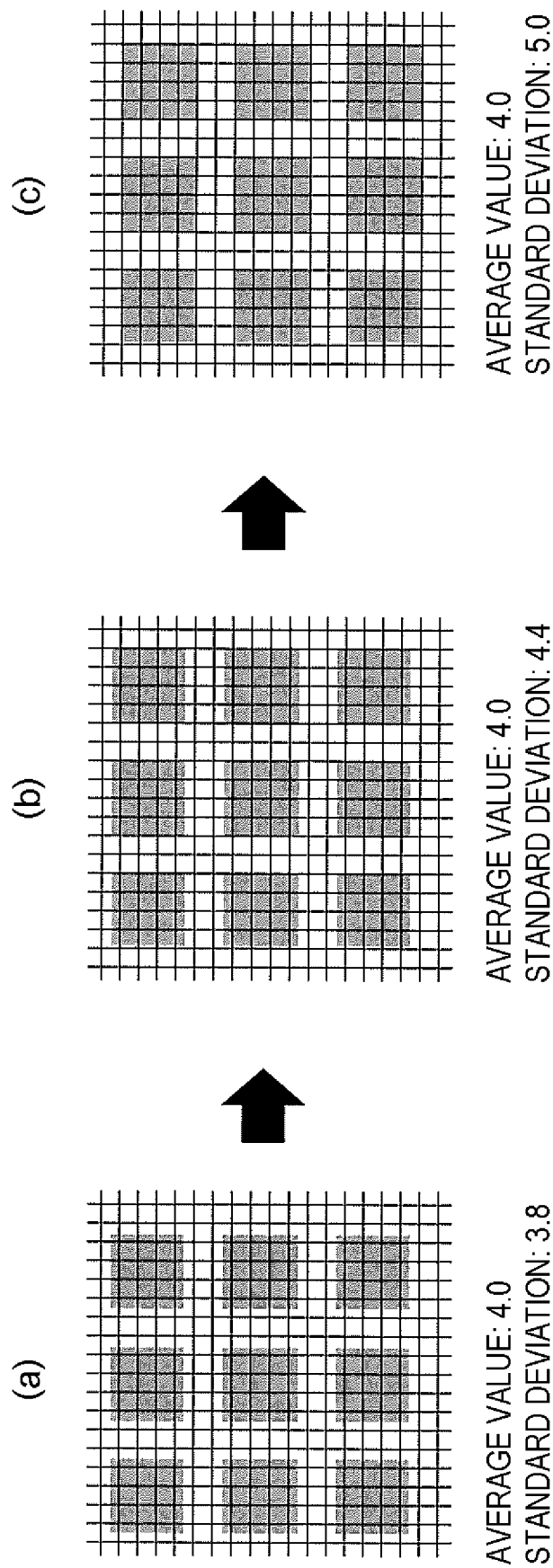
FIG. 8 is a diagram to illustrate a standard deviation-based adjustment method when X-axis and Y-axis adjustment are performed.

In FIG. 8(a), the standard deviation of the all pixel intensities is 3.8. FIG. 8(b) illustrates the relative position after the X-axis direction adjustment, and FIG. 8(c) illustrates the relative position after the Y-axis direction adjustment. Using these adjustments, the standard deviation is maximized. Through this series of adjustments, the number of data points can be increased. Furthermore, the pixel intensity values are actual measurement values of the camera 8, and FIG. 8 is one example.

Figure 9:
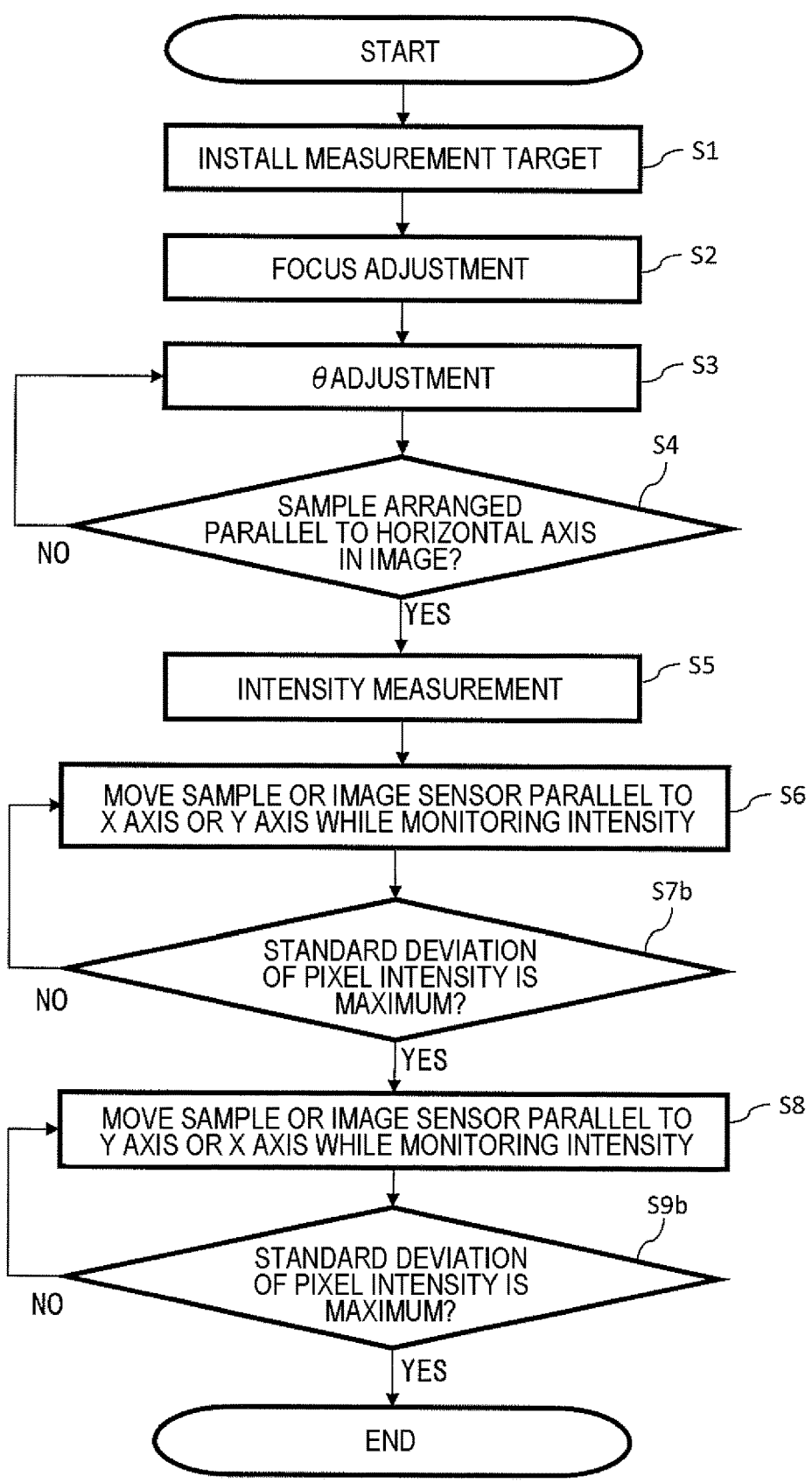
FIG. 9 is a flowchart when the method of FIG. 8 is used.

FIG. 9 illustrates a flowchart of the operation of FIG. 8. The flowchart is the same as that of the first embodiment (FIG. 2) except for S7b and S9b. In S7b and S9b, a branch determination is made based on the standard deviation value.

That is, the XYZ-axis stage 5 changes the camera 8 and the measurement target 4 in the X-axis direction based on the standard deviation of the pixel intensity in the image, and then similarly changes the relative position in the Y-axis direction based on the standard deviation of the pixel intensity in the image.

As described above, also in the second embodiment, the number of in-well data points can be similarly increased, and the reliability of the signal strength can be further enhanced.

Third Embodiment

Figure 10:
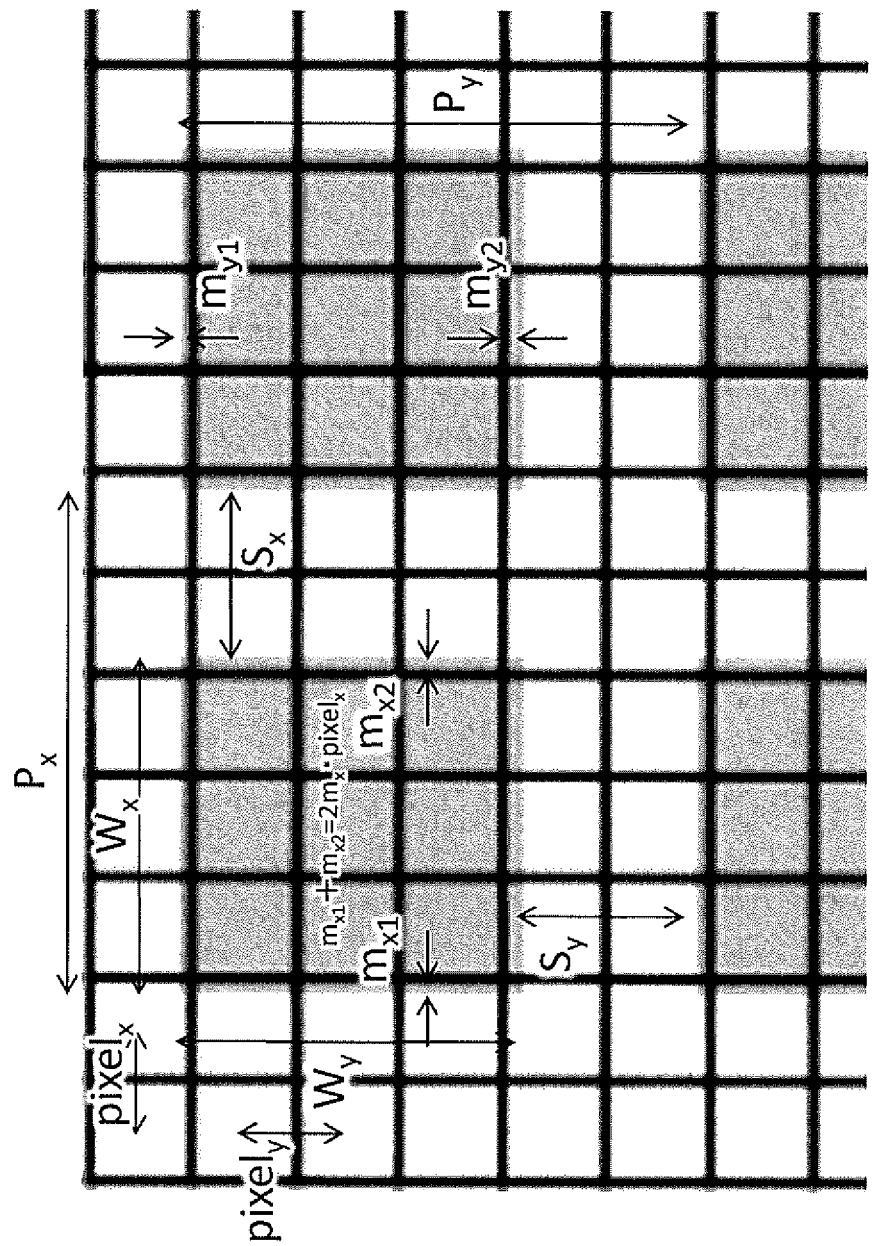
FIG. 10 is a diagram to illustrate the relationship between multiwells and photodetector pitches.

A third embodiment will be described hereinbelow with reference to FIG. 10. Descriptions of parts common to either of the first and second embodiments may be omitted.

The third embodiment serves to determine a multiwell configuration for increasing the number of well data points. In the third embodiment, the well shape is a quadrangle. The well pitch of the multiwell is determined on the basis of the imaging magnification of the measurement system, the photodetector pixel pitch, and the like. By using the multiwell configuration disclosed in the present embodiment, the number of data points covering wells can be increased.

The multiwell configuration is determined by the following Formulas 1 to 8, and is described by a pixel pitch, a protrusion ratio, and a positive integer. The protrusion ratios $(m_x, m_y)$ and the positive integers (a, b, c, d) satisfy the conditions of Formulas 7 and 8.

[Equation 1]

$$W_x = a \cdot \text{pixel}_x + 2m_x \cdot \text{pixel}_x \quad \text{(Formula 1)}$$
$$= \text{pixel}_x(a + 2m_x)$$
$$S_x = b \cdot \text{pixel}_x - 2m_x \cdot \text{pixel}_x \quad \text{(Formula 2)}$$
$$= \text{pixel}_x(b - 2m_x)$$
$$P_x = W_x + S_x \quad \text{(Formula 3)}$$
$$= \text{pixel}_x(a + b)$$
$$W_y = c \cdot \text{pixel}_y + 2m_y \cdot \text{pixel}_y \quad \text{(Formula 4)}$$
$$= \text{pixel}_y(c + 2m_y)$$
$$S_y = d \cdot \text{pixel}_y - 2m_y \cdot \text{pixel}_y \quad \text{(Formula 5)}$$
$$= \text{pixel}_y(d - 2m_y)$$
$$P_y = W_y + S_y \quad \text{(Formula 6)}$$
$$= \text{pixel}_y(c + d)$$
$$a \geq b \geq 1, c \geq d \geq 1 \quad \text{(Formula 7)}$$
$$m_x < 1, m_y < 1$$

-continued $$m_{x1} + m_{x2} = 2m_x \cdot \text{pixel}_x \quad \text{(Formula 8)}$$

When $m_{x1} = m_{x2}$ $$m_{x1} = m_{x2} = m_x \cdot \text{pixel}_x$$

Formulas 1 to 3 are formulas that determine the arrangement condition of the multiwell in the X-axis direction, and Formulas 4 to 6 are formulas that determine the arrangement condition of the multiwell in the Y-axis direction. Where pixel$_x$: pixel pitch in x direction
pixel$_y$: pixel pitch in y direction
$W_x$: well size in x direction×imaging magnification
$W_y$: well size in y direction×imaging magnification
$S_x$: well interval in x direction×imaging magnification
$S_y$: well interval in y direction×imaging magnification
$P_x$: well pitch in x direction×imaging magnification
$P_y$: well pitch in y direction×imaging magnification
$m_{x1}$: Protrusion amount in x direction
$m_{x2}$: Protrusion amount in x direction
$m_{y1}$: Protrusion amount in y direction
$m_{y2}$: Protrusion amount in y direction
$m_x$: Protrusion ratio in x direction
$m_y$: Protrusion ratio in y direction
a, b, c, d: positive integer.

Each well and/or the camera 8 is configured such that a value ($W_x$ and $W_y$) obtained by multiplying the pitch of each well by the imaging magnification is an integer multiple, which is two or more times, of the pixel pitch (pixel$_x$ and pixel$_y$) of the camera 8. For example, one side of a well enlarged in an image is configured to span an integer number of pixels (specifically two or more. 4 in the example of FIG. 5). In particular, it is preferable to configure the wells such that the value obtained by multiplying the well pitch by the imaging magnification is an integer multiple, which is 5 times or more, of the pixel pitch of the camera 8 because one well can then be covered with a sufficient number of pixels (for example, 25 or more).

According to the present embodiment, it is preferable that "well pitch×imaging magnification" be an integer multiple, which is two or more times, of the "pixel pitch". For example, when "well pitch×imaging magnification" is two times the "pixel pitch", one pixel may be allocated to the well and one pixel may be allocated to the well partition wall in the X-axis direction and the Y-axis direction, respectively. In order to increase the number of in-well data points, positive integers (a, c) can be set at large values.

Fourth Embodiment

Hereinafter, a fourth embodiment will be described with reference to FIG. 11. Descriptions of parts common to any of the first to third embodiments may be omitted.

The fourth embodiment indicates that the number of in-well data points can be increased by performing the imaging visual field adjustment according to the first embodiment even when the well shape is not a quadrangle but a circle or a hexagon. In the fourth embodiment, the wells are circular wells 400. When imaging is performed without adjusting the imaging range, the number of pixels fully covering (within) wells is, for example, about 8 per well. On the other hand, by adjusting the imaging range, the number of fully covering pixels can be increased to 9 per well.

In a certain modification, it is possible to increase the number of data points even when hexagonal wells are used. However, because the pixel shape of the camera 8 is generally quadrangular, the quadrangular well 100 (FIG. 5) is more compatible, and yields a large number of data points. Similarly, it can be said that it is better, from the viewpoint of increasing the number of data points, to arrange multi-wells in a lattice pattern (that is, a configuration in which each column of each row is arranged on a straight line) than to arrange the multiwells using hexagonal closest packing (that is, a configuration in which each row is shifted by half column).

The shape of the well can be configured to be, for example, circular and such that the diameter is from 5 μm to 100 μm inclusive. Alternatively, the shape may be configured to be hexagonal and such that diameter of the circumscribed circle is from 5 μm to 100 μm inclusive. The shape may alternatively be configured to be square and such that the length of one side is from 5 μm to 150 μm inclusive. Such a configuration conforms well to existing imaging systems.

Fifth Embodiment

Hereinafter, a fifth embodiment will be described with reference to FIG. 12. Descriptions of parts common to any of the first to fourth embodiments may be omitted.

The fifth embodiment illustrates an advantageous effect obtained by using quadrangular wells to execute the imaging range adjustment method. A camera 8 having a pixel size of 6.5×6.5 μm and hexagonal wells having a circumscribed circle diameter of 60 μm are used.

In a case where the imaging magnification of the microscope is 1.16 times, the number of pixels (full pixels) fully covering the hexagonal wells is about 57 on average. When the full pixel coverage is defined as the total surface area of the full pixels with respect to the well surface area, the coverage is 76.5%. However, in a case where the imaging range is adjusted in the same measurement system by using square wells each having a side of 44.83 μm, the number of full pixels in a square well is 64, and the full pixel coverage rate is almost 100%.

By adjusting the well pitch and the pixel pitch, it is possible to increase the number of effective pixels in the measurement. Furthermore, in a case where the same numbers of data points are acquired for hexagonal wells and quadrangular wells, it is possible to reduce the well surface area by using quadrangular wells. It is thus possible to increase the number of wells that can be measured at a time. For example, under the conditions of FIG. 12, the well surface area can be reduced by about 25%. Therefore, in a case where there is a chip in which 20,000 wells can be arranged using hexagonal wells, 25,000 wells can be arranged using quadrangular wells.

Sixth Embodiment

A sixth embodiment will be described hereinbelow with reference to FIG. 13. Descriptions of parts common to any of the first to fifth embodiments may be omitted.

Figure 12:
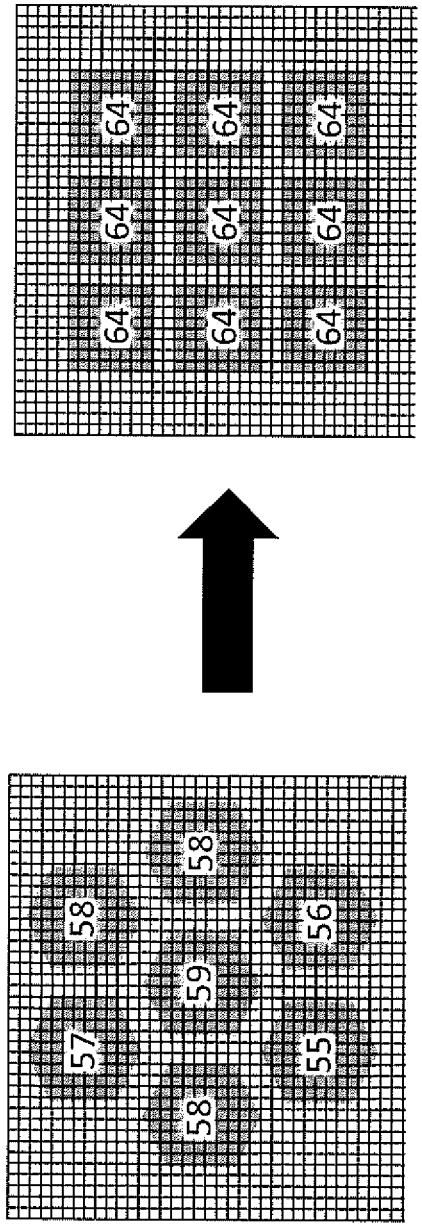
FIG. 12 is a diagram to illustrate an advantageous effect obtained by applying an imaging range adjustment method to quadrangular wells.

The sixth embodiment illustrates that similar advantageous effects can be acquired even if the pixel size or the well size are changed from the conditions of FIG. 12. The camera 8 is capable of changing the pixel size of the sensors, and of selecting from several types, for example. For example, in a case where the pixel size is changed from 6.5×6.5 μm to a pixel size of 4.5×4.5 μm, by appropriately changing the well size according to the calculation formula of the third embodiment, it is possible to maintain the same number of data points before and after the change.

In a case where the well size is changed from 60 µm to a well size of 30 µm, the number of data points decreases in the same measurement system. In such a case, the camera lens 7 of the imaging system is changed, and the imaging magnification is changed to two times. It is thus possible to increase the number of data points.

As described above, according to the present embodiment, the present technology can easily cope with a case where the camera is changed or the multiwell size is changed, and the number of data points can be increased.

Seventh Embodiment

Figure 14:
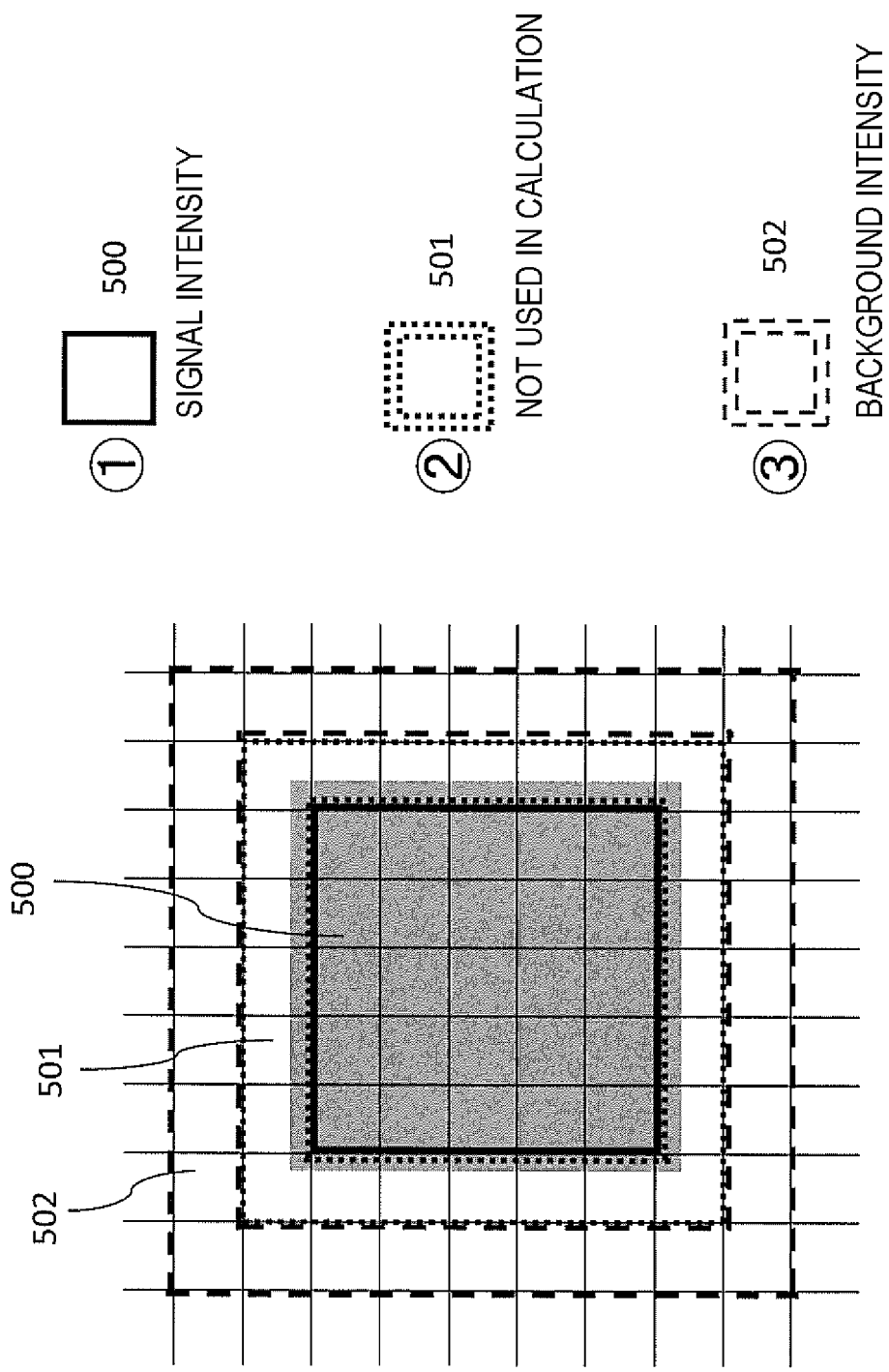
FIG. 14 is a diagram to illustrate a signal analysis method of in-well pixel intensity.

A seventh embodiment will be described hereinbelow with reference to FIG. 14. Descriptions of parts common to any of the first to sixth embodiments may be omitted.

A seventh embodiment provides a signal analysis method for data acquired after imaging range adjustment (for example, after completion of the processing of FIG. 2). A region in an image is divided into three regions: a region 500 of pixels fully covering wells, a region 501 of pixels partially covering wells, and a region 502 of pixels not covering wells at all.

The signal analysis utilizes a region 500 of pixels fully covering wells (pixels entireties of which correspond to an object to be imaged) and a region 502 of pixels not covering wells at all (pixels entireties of which correspond to the background), and does not utilize a region 501 of pixels partially covering wells (pixels parts of which correspond to the object to be imaged and other parts of which correspond to the background).

For example, in a case where an adjustment is made based on a histogram of pixel intensities, the histogram of pixel intensities includes the pixel intensities of the region 500 and the pixel intensities of the region 502, but does not include the pixel intensities of the region 501. The pixels can be similarly limited in a case where the standard deviation is used.

The intensities of the region 500 are defined as signal intensities, and the intensities of the region 502 are defined as background intensities. The analysis may use a minimum of one of the pixels of each region, or may use at most all the pixels therein. The signal intensity may be used as is, or a value obtained by subtracting the background intensity from the signal intensity may be used. In addition, an average intensity for each of the signal intensities and the background intensities may be calculated and used for analysis.

Such signal analysis can be applied to well counting in digital PCR, for example. By using only the region 500 and the region 502 and discarding the region 501, wells emitting light and wells not emitting light can be discriminated more accurately, and the number of wells can be counted more accurately.

Other Embodiments

Note that the present invention is not limited to or by the above-described embodiments and includes various modifications. For example, the above-described embodiments have been described in detail to facilitate understanding of the present invention, and the present invention is not necessarily limited to or by embodiments having all the configurations described. In addition, part of the configuration of one embodiment can be replaced with the configuration of another embodiment, and the configuration of the other embodiment can also be added to the configuration of the one embodiment. Moreover, it is possible to add other configurations to part of the configuration of each embodiment, and to delete or replace part of the configuration of each of the embodiments.

REFERENCE SIGNS LIST 1 light source
2 lens
3 half mirror
4 plurality of measurement targets
5 XYZ-axis stage
6 θ-axis stage
7 camera lens
8 camera (photodetector)
9 imaging unit circuit
10 control circuit
11 memory
12 analysis unit
13 computer
14 operation unit
15 display unit
100 quadrangular well
200 reference marker
300 pixel
301 pixel of intensity 0
302 pixel of intensity 2.5
303 pixel of intensity 4
304 pixel of intensity 5
305 pixel of intensity 10
400 circular well
500 region of pixels fully covering wells
501 region of pixels partially covering wells
502 region of pixels not covering wells

The invention claimed is:

1. An imaging system that images a change in color by a reaction of digital Polymerase Chain Reaction (PCR) for a plurality of measurement targets arranged on a plane, the imaging system comprising:
  a light source that irradiates the plurality of measurement targets with light;
  a photodetector that detects light from the plurality of measurement targets and acquires an image;
  one or more lenses;
  an adjustment mechanism that focuses imaging on the plurality of measurement targets in a depth direction; and
  a drive mechanism that changes relative position of the photodetector and the plurality of measurement targets; and
  an analysis mechanism that performs digital count measurement,
  wherein the drive mechanism is configured to rotate at least one of the plurality of measurement targets or the photodetector so that the plurality of measurement targets are arranged in a horizontal direction or a vertical direction within the image and change a relative position of the photodetector and the plurality of measurement targets in a horizontal axial direction and/or in a vertical axial direction orthogonal to the first axial direction and the depth direction,
  wherein the plurality of measurement targets have a same shape and a same size, wherein the plurality of measurement targets are arranged at equal pitches in a longitudinal direction and a lateral direction on the plane, wherein a value obtained by multiplying the pitch of the plurality of measurement targets by an imaging magnification is an integer multiple, which is two or more times, of a pixel pitch of the photodetector, and wherein in the changing of the relative position by the drive mechanism, the drive mechanism is configured to arrange the plurality of measurement targets in the image in the horizontal direction and the vertical direction, and then to adjust the relative position in at least one of the horizontal axial direction and the vertical axial direction, and an adjustment unit of an imaging range is equal to or less than the pixel pitch.

2. The imaging system according to claim 1, further comprising:

a memory that records data from the photodetector, wherein the analysis mechanism is configured to analyze the data, and wherein the drive mechanism adjusts the relative position according to a detection result of the photodetector.

3. The imaging system according to claim 1, wherein each of the measurement targets is circular and has a diameter from 5 μm to 100 μm inclusive, is a hexagon and has a circumscribed circle diameter from 5 μm to 100 μm inclusive, or is a square and has a side length from 5 μm to 150 μm inclusive.

4. The imaging system according to claim 1, wherein the value obtained by multiplying the pitch of the plurality of measurement targets by an imaging magnification is an integer multiple, which is five times or more, of the pixel pitch of the photodetector.

5. The imaging system according to claim 1, wherein the imaging magnification is 0.4 times to 2.5 times inclusive.

6. The imaging system according to claim 1, wherein a number of the measurement targets is 10,000 or more.

7. The imaging system according to claim 1, wherein the photodetector is a CCD or CMOS camera.

8. The imaging system according to claim 7, wherein a number of imaging elements of the photodetector is 1,000,000 or more.

9. An imaging range adjustment method for imaging a change in color by a reaction of digital PCR for a plurality of measurement targets arranged on a plane, the imaging range adjustment method being executed by an imaging system, the imaging system having:

a light source that irradiates the plurality of measurement targets with light;

a photodetector that detects light from the plurality of measurement targets;

one or more lenses;

an adjustment mechanism that focuses imaging on the plurality of measurement targets;

a drive mechanism that changes relative position of the photodetector and the plurality of measurement targets; and an analysis mechanism that performs digital count measurement, the plurality of measurement targets having a same shape and a same size, the plurality of measurement targets being arranged at equal pitches in a longitudinal direction and a lateral direction on the plane, the imaging range adjustment method comprising:

performing focusing on the plurality of measurement targets by the drive mechanism in a depth direction;

acquiring an image by imaging the plurality of measurement targets by means of the photodetector;

rotating at least one of the plurality of measurement targets or the photodetector by the drive mechanism such that the plurality of measurement targets are arranged in a horizontal direction or a vertical direction within the image;

changing the relative position of the photodetector and the plurality of measurement targets in either a horizontal axial direction or a vertical axial direction orthogonal to the horizontal axial direction and the depth direction by the drive mechanism, based on a peak shape of at least one of a peak of maximum intensity or a peak of minimum intensity among peaks in a histogram of pixel intensities in the image; and changing the relative position to the other of the horizontal axial direction or the vertical axial direction by the drive mechanism, based on a peak shape of at least one of the peak of maximum intensity or the peak of minimum intensity among the peaks in the histogram of pixel intensities in the image.

10. The imaging range adjustment method according to claim 9, wherein the drive mechanism changes the relative position based on a surface area of the peak or a height of the peak.

11. The imaging range adjustment method according to claim 10, wherein the surface area of the peak is a surface area within a range of an average value±a standard deviation of the pixel intensities at the peak.

12. The imaging range adjustment method according to claim 9, wherein the drive mechanism changes the relative position based on a sum of heights of the peak of maximum intensity and the peak of minimum intensity among the peaks in the histogram.

13. The imaging range adjustment method according to claim 9, wherein the histogram includes: pixel intensities of pixels entirety of which correspond to an object to be imaged; and pixel intensities of pixels entirety of which correspond to a background, and does not include pixel intensities of pixels part of which correspond to the object to be imaged and other part of which correspond to the background.

14. An imaging range adjustment method for imaging a change in color by a reaction of digital PCR for a plurality of measurement targets arranged on a plane, the imaging range adjustment method being executed by an imaging system, the imaging system having:

a light source that irradiates the plurality of measurement targets with light;

a photodetector that detects light from the plurality of measurement targets;

one or more lenses;

an adjustment mechanism that focuses imaging on the plurality of measurement targets in a depth direction;

a drive mechanism that changes relative position of the photodetector and the plurality of measurement targets; and an analysis mechanism that performs digital count measurement, the plurality of measurement targets having a same shape and a same size, the plurality of measurement targets being arranged at equal pitches in a longitudinal direction and a lateral direction on the plane, the imaging range adjustment method comprising:

performing focusing on the plurality of measurement targets by the drive mechanism;

acquiring an image by imaging the plurality of measurement targets by means of the photodetector;

rotating at least one of the plurality of measurement targets or the photodetector by the drive mechanism such that the plurality of measurement targets are arranged in a horizontal direction or a vertical direction within the image;

changing the relative position in either a horizontal axial direction or a vertical axial direction orthogonal to the horizontal axial direction and the depth direction by the drive mechanism based on a standard deviation of pixel intensities in the image; and changing the relative position to the other of the horizontal axial direction or the vertical axial direction orthogonal to the first axial direction by the drive mechanism based on a standard deviation of pixel intensities in the image.

15. The imaging system according to claim 1, wherein the drive mechanism performs adjustment in a horizontal direction so that a period of a pixel intensity in a well position and a background intensity is constant.

* * * * *